United States Patent [19]

Ritter et al.

[11] 4,172,156
[45] Oct. 23, 1979

[54] METHOD OF DEPOSITING A REFLECTION REDUCING COATING ON SUBSTRATES OF ORGANIC MATERIAL

[75] Inventors: Elmar Ritter; Ludwig R. Kaminski; Karl Hohenegger, all of Vaduz, Liechtenstein

[73] Assignee: Balzers Aktiengesellschaft für Hochvakuumtechnik und Dünne Schichten, Liechtenstein

[21] Appl. No.: 863,703

[22] Filed: Dec. 23, 1977

[30] Foreign Application Priority Data

Dec. 27, 1976 [CH] Switzerland .................. 016341/76

[51] Int. Cl.² .................................................. B05D 3/06
[52] U.S. Cl. ........................................ 427/38; 427/42; 427/162; 427/164; 427/250; 350/165
[58] Field of Search .................. 427/38, 39, 42, 50, 427/161, 162, 164, 250, 251; 350/163, 165

[56] References Cited

U.S. PATENT DOCUMENTS

| 2,207,656 | 7/1940 | Cartwright et al. | 350/165 |
| 2,758,510 | 8/1956 | Auwarter | 351/163 |
| 4,056,649 | 11/1977 | Walls et al. | 427/164 |
| 4,058,638 | 11/1977 | Morton | 427/39 |
| 4,070,097 | 1/1978 | Gelber | 350/165 |

*Primary Examiner*—John H. Newsome
*Attorney, Agent, or Firm*—McGlew and Tuttle

[57] ABSTRACT

A method of depositing a reflection reducing coating on a substrate of organic material preferably on a spectacle glass of plastic by evaporation in a vacuum comprises depositing chromium by evaporation in an oxygen atmosphere under a pressure of betweeen $4 \times 10^{-5}$ and $8 \times 10^{-5}$ torr at a rate of from 0.01 to 0.05 nm per second and in a thickness of from 1 to 10 nm.

1 Claim, 1 Drawing Figure

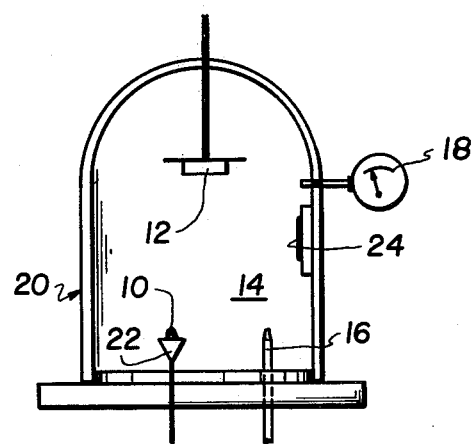

METHOD OF DEPOSITING A REFLECTION REDUCING COATING ON SUBSTRATES OF ORGANIC MATERIAL

BACKGROUND OF THE INVENTION

1. Field of the Invention

This invention relates in general to methods for coating materials particularly by evaporation in a vacuum and in particular to a new and useful process for coating an organic material particularly a spectacle glass made of plastic which comprises depositing a deflection reducing coating of chromium on a substrate by evaporation in an oxygen atmosphere under a pressure of from between $4 \times 10^{-5}$ and $8 \times 10^{-5}$ torr and at a rate of from 0.01 to 0.05 nm per second and to a thickness of from one to 10 nm.

2. Description of the Prior Art

A problem underlying the invention is to deposit reflection reducing coatings on substrates of plastic, for example, on spectacle glasses, which coatings would be sufficiently hard and firmly adherent and capable of resisting atmospheric and chemical influences. In particular, up to the present time, a satisfactory resistance to salt water, as frequently required, for example, for spectacle glasses could be obtained only with difficulties. Extensive laboratory tests have shown that if reflection reducing coating such as usual for glass are deposited on plastics, they are not sufficiently resistant.

SUMMARY OF THE INVENTION

The present invention is directed to a method making it possible to produce resistant, reflection reducing coatings on substrates of organic material, preferably on spectacle glasses of plastic, by evaporation in vacuum.

In accordance with the invention of reflection reducing coating of a chromium is deposited by evaporation on a substrate of organic material which comprises evaporation of the chromium in an oxygen atmosphere under a pressure of between $4 \times 10^{-5}$ and $8 \times 10^{-5}$ torr by evaporation at a rate of from 0.01 to 0.05 nm per second and to a thickness of from 1 to 10 nm. Thereafter by means of an electron beam evaporation source and under a pressure of less than $5 \times 10^{-5}$ torr depositing a silicon dioxide $SiO_2$ by evaporation at a rate of from 0.5 to 1.5 nm per second over the chromium deposit and to a thickness of from 50 to 150 microns and thereafter in an oxygen atmosphere under a pressure of 0.1 to 0.01 torr and with a glow potential of the electrode of less than 3000 volts subjecting total coating to an afterglow of from one to ten minutes.

In this way, surprisingly, coatings are obtained which adhere unusually firmly to plastics and which, even upon exposure to strong climatic changes, are not affected by peeling off or other phenomena of destruction.

Accordingly it is an object of the invention to provide a method of depositing a reflection reducing coating on substrates of organic material and preferably on spectacle glasses of plastic material which comprises depositing a first layer of chromium by evaporation in an oxygen atmosphere under a pressure of from between $4 \times 10^{-5}$ and $8 \times 10^{-5}$ torr at a rate of from 0.01 to 0.05 microns per second and up to a thickness of 1 to 10 microns, thereafter depositing a second layer of silicon dioxide ($SiO_2$) by means of an electron beam evaporation source under a pressure of less than $5 \times 10^{-5}$ and an evaporation rate of 0.5 to 1.5 microns per second and to a thickness of from 50 to 150 microns and thereafter subjecting the combined first and second coatings to an afterglowing from one to ten minutes in an oxygen atmosphere under a pressure of from 0.1 to 0.01 torr with a glow potential of less than 3000 volts.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the Drawing:

The only FIGURE of the drawing is a schematic representation of a vacuum evaporation deposit device for carrying out the method of the invention.

GENERAL DESCRIPTION OF THE PREFERRED EMBODIMENT

Referring to the only FIGURE of the drawing, there is indicated a representation of a device for evaporating a coating material 10 onto a substrate 12 of an organic material such as a plastic spectacle lens or glass. The evaporation is carried out in a vacuum in a chamber 14 in which an electron gun or an electrode 16 is connected to a suitable power source so as to produce a glow discharge under a vacuum condition within the chamber 14 measured by a gauge 18. The whole unit generally designated 20 comprises a conventional evaporation unit.

Plastic glasses available under the commercial designation CR 39 (polymers of diethyl glycol bis allyl carbonate) have first been cleaned in an ultrasonic bath. After evacuation of the conventional vacuum evaporation unit 20 to a pressure below $10^{-5}$ torr, oxygen is introduced into the apparatus until reaching a pressure of $6 \times 10^{-5}$ torr. Then a first layer of chromium is evaporated and deposited on the substrate 12 at a rate of from 0.01 to 0.05 microns per second until a layer thickness of 3 microns is obtained for example. With a partial pressure of oxygen of less than $5 \times 10^{-5}$ torr and while maintaining a vapor deposition rate of 0.02–0.03 nm per second, a desired layer thickness of 3 microns can result in an absorption of 0.5% by the chromium oxide layer obtained by reactive evaporation.

In an example for producing the desired coating, the apparatus is again evacuated to less than $10^{-6}$ torr and, by means of the electron gun 16, silicon dioxide placed on support 22 in place of layer 10 is evaporated and deposited on the chromium oxide coating as a second layer. The vapor deposition of $SiO_2$ is continued until a layer thickness is reached showing a minimum of reflection, which could be checked by continuously measuring the reflection of a test glass 24 placed in the evaporator chamber 14 and coated simultaneously with the evaporated substance.

The reflection reducing coatings obtained in this way exhibited a resistance to saline water of 1000 hours, i.e. they could remain immersed for 1000 hours in a 4% saline water without showing any phenomena of destruction. Further, for testing the so-called resistance to climatic changes, the following test has been carried out (satisfying the standard acceptance conditions for particularly exacting applications): The coated glasses were placed in a climatic chamber such as chamber 14 having an initial temperature of 20° C. and relative humidity of 45%. Within a period of 2 hours, these initial values have been increased to 70° C. and 95% of relative humidity and then the glasses have been kept under these conditions for 8 hours. During the following 14 hours, the temperature has been slowly lowered to 20° C. again and the relative humidity to 45%. This cycle has been repeated three times. After the test lasting for a total of 72 hours no phenomena of wear or other damages of the coating have been found on the glasses.

Sometimes a higher degree of absorption of the layers is desirable, for example, for eye protecting glasses (known as "filter glasses"). This may be obtained in two ways; either the chromium oxide layer is made thicker or the reactive vapor deposition of the chromium oxide layer is carried out in a differently adjusted oxygen atmosphere.

Surprisingly, experience has been made that in any case, the subsequent $SiO_2$ layer must be applied by means of an electron beam evaporation source if the high quality of the layer is to be obtained. The evaporation of the usual thermal evaporation source would lead to layers meeting neither the optical nor the resistance requirements. Finally, the third of the indicated operational steps, namely the after-glowing in an oxygen atmosphere at a pressure of 0.1 to 0.01 torr, is also necessary and, according to experience, cannot be substituted by other oxidizing operational steps.

While a specific embodiment of the invention has been shown and described in detail to illustrate the application of the principles of the invention, it will be understood that the invention may be embodied otherwise without departing from such principles.

What is claimed is:

1. A method of depositing a reflection reducing coating on substrates of organic material, preferably on spectacle glasses of plastic, by evaporation in vacuum, comprising depositing chromium on the substrate in a first layer and in an oxygen atmosphere under a pressure of between $4 \times 10^{-5}$ and $8 \times 10^5$ torr by evaporation at a rate of 0.01 to 0.05 nm per second and in a thickness of 1 to 10 nm; then depositing $SiO_2$ in a second layer over said first layer by means of an electron beam evaporation source and under a pressure of less than $5 \times 10^{-5}$ torr, by evaporation at a rate of 0.5 to 1.5 nm per second and in a thickness of 50 to 150 nm to form a complete coating and thereupon, in an oxygen atmosphere under a pressure of 0.1 to 0.01 torr and with a glow potential of less than 3000 V, subjecting the complete coating to after-glowing for 1 to 10 minutes.

* * * * *